(12) United States Patent
Fröhlich et al.

(10) Patent No.: US 10,774,395 B2
(45) Date of Patent: Sep. 15, 2020

(54) METHOD FOR MANUFACTURING A COMPONENT MADE OF AUSTENITIC STEEL

(71) Applicant: Outokumpu Oyj, Helsinki (FI)

(72) Inventors: Thomas Fröhlich, Ratingen (DE); Stefan Lindner, Willich (DE)

(73) Assignee: Outokumpu Oyj, Helsinki (FI)

(*) Notice: Subject to any disclaimer, the term of this patent is extended or adjusted under 35 U.S.C. 154(b) by 317 days.

(21) Appl. No.: 15/575,541

(22) PCT Filed: May 23, 2016

(86) PCT No.: PCT/EP2016/061560
§ 371 (c)(1),
(2) Date: Nov. 20, 2017

(87) PCT Pub. No.: WO2016/188948
PCT Pub. Date: Dec. 1, 2016

(65) Prior Publication Data
US 2018/0127844 A1 May 10, 2018

(30) Foreign Application Priority Data
May 22, 2015 (EP) .................... 15168786

(51) Int. Cl.
| | | |
|---|---|---|
| C21D 6/00 | (2006.01) |
| C22C 38/58 | (2006.01) |
| C22C 38/00 | (2006.01) |
| C22C 38/38 | (2006.01) |
| B62D 25/04 | (2006.01) |
| B62D 29/00 | (2006.01) |

(52) U.S. Cl.
CPC ............. *C21D 6/005* (2013.01); *B62D 25/04* (2013.01); *B62D 29/007* (2013.01); *C22C 38/001* (2013.01); *C22C 38/38* (2013.01); *C22C 38/58* (2013.01); *C21D 2211/001* (2013.01)

(58) Field of Classification Search
CPC .. C21D 6/005; C21D 2211/001; B62D 25/04; B62D 29/007; C22C 38/001; C22C 38/38; C22C 38/58
USPC .......................................................... 148/609
See application file for complete search history.

(56) References Cited

U.S. PATENT DOCUMENTS

| | | | |
|---|---|---|---|
| 7,806,165 B2 * | 10/2010 | Kroos .................. | B22D 11/045 164/423 |
| 10,144,986 B2 * | 12/2018 | Kim ......................... | C21D 8/02 |
| 2006/0174983 A1 | 8/2006 | Gerick et al. | |

(Continued)

FOREIGN PATENT DOCUMENTS

| | | | |
|---|---|---|---|
| CN | 102312158 A | | 1/2012 |
| CN | 103556052 | * | 2/2014 |

(Continued)

*Primary Examiner* — Colleen P Dunn
*Assistant Examiner* — Anthony M Liang
(74) *Attorney, Agent, or Firm* — The Webb Law Firm

(57) ABSTRACT

The invention relates to a method for manufacturing a component made of austenitic manganese alloyed steel using transformation induced plasticity. The component is deformed so that the component has an essentially same thickness of 0.5-2 millimeter in each region of the component, and the component has at least two regions having different mechanical property values.

14 Claims, 2 Drawing Sheets

(56) References Cited

U.S. PATENT DOCUMENTS

| | | | |
|---|---|---|---|
| 2006/0179638 A1* | 8/2006 | Engl | C21D 8/0205 |
| | | | 29/527.7 |
| 2010/0051146 A1 | 3/2010 | Park et al. | |
| 2013/0048150 A1 | 2/2013 | John et al. | |
| 2013/0338757 A1* | 12/2013 | Gerold | A61F 2/06 |
| | | | 623/1.15 |
| 2015/0329947 A1 | 11/2015 | Ferraiuolo | |
| 2016/0122839 A1 | 5/2016 | Evertz et al. | |
| 2018/0207695 A1* | 7/2018 | Frohlich | B21C 37/02 |

FOREIGN PATENT DOCUMENTS

| | | | |
|---|---|---|---|
| CN | 103556052 A | 2/2014 | |
| DE | 102004054444 B3 | 1/2006 | |
| EP | 2090668 A1 * | 8/2009 | C21D 6/001 |
| EP | 2090668 A1 | 8/2009 | |
| EP | 2649214 B1 | 12/2016 | |
| EP | 1846584 B1 * | 5/2017 | C22C 38/04 |
| KR | 1020100028310 A | 3/2010 | |
| WO | WO-2005019483 A1 * | 3/2005 | C21D 8/0205 |
| WO | WO-2009090231 A1 * | 7/2009 | C22C 38/38 |
| WO | 2009095264 A1 | 8/2009 | |
| WO | 2011081349 A3 | 7/2011 | |
| WO | 2014097184 A2 | 6/2014 | |
| WO | 2014180456 A1 | 11/2014 | |

* cited by examiner

METHOD FOR MANUFACTURING A COMPONENT MADE OF AUSTENITIC STEEL

CROSS-REFERENCE TO RELATED APPLICATIONS

This application is the United States national phase of International Application No. PCT/EP2016/061560 filed May 23, 2016, and claims priority to European Patent Application No. 15168786.0 filed May 22, 2015, the disclosures of which are hereby incorporated in their entirety by reference.

BACKGROUND OF THE INVENTION

Field of the Invention

The present invention relates to a method for manufacturing a component made of austenitic manganese alloyed steel using the TWIP (Twinning-Induced Plasticity) effect of the steel to achieve a component having an essentially same thickness for the whole component but having regions with different mechanical property values.

Description of Related Art

When manufacturing components for transport systems such as cars, trucks, busses, railway or agricultural vehicles austenitic or ferritic steels, realizing the TRIP (Transformation induced plasticity), are used. It is calculated how much strength and material thickness is needed to fulfil the safety requirements. But when there are areas of a component which have a higher thickness than required, it is described as "overdesigned". Therefore it is desirable to have the right material at the right place without overdesigning. Such possibilities are called "multi-material design" or "Tailored products" like Tailored roll forming, Tailored tempering or Tailored welded blanks. This means actually that it is calculated with homogeneous material properties and therefore construct only with thicknesses or to put different materials and sheets together.

The US publication 2013048150 describes a method for producing a workpiece having properties which are adjustable across a wall or a strip thickness by a special decarburizing annealing process, using the TRIP hardening effect of a high-manganese alloyed steel.

The WO publication 2014180456 describes a method for producing with only one material, austenitic lightweight construction steel, a component which has different material properties. The core is reached by a specific forming, where the austenitic lightweight construction steel has a temperature-dependent transformation induced plasticity (TRIP) and/or twinning induced plasticity effect (TWIP) during transformation. The component is made to obtain high toughness during a temperature 40-160° C. above the room temperature and to obtain high strength during the temperature −65° C. to 0° C. below the room temperature. A cryogenic treatment is described also in the US publication 2014328715 in a method for producing a TWIP and nano twinned austenitic stainless steel containing less than 0.018 wt % C, 0.25-0.75 wt % Si, 1.5-2 wt % Mn, 17.80-19.60 wt % Cr, 24.00-25.25 wt % Ni, 3.75-4.85 wt % Mo, 1.26-2.78 wt % Cu, 0.04-0.15 wt % N the rest being Fe and unavoidable impurities.

The TWIP (Twinning-Induced Plasticity) effect depends on the chemical composition, austenitic microstructure hardening effect and the stacking fault energy (20-30 mJ/m$^2$). In the TWIP effect a large amount of deformation is driven by the formation of deformation twins. The twinning causes a high value of instantaneous hardening rate when the microstructure becomes finer and finer. The resultant twin boundaries act like grain boundaries and strengthen the steel. The hardening rate value increases to a value of 0.4 at an approximate engineering strain of 30% and then remains constant until both the uniform elongation and the total elongation reach 50%.

The method for manufacturing of steel grades having the TWIP effect with different chemical compositions is also described for instance in the CN publication 103556052, in the CN publication 102312158, in the EP publication 2649214, in the KR publication 20100028310 and in the KR publication 20100009222.

The WO publication 2014/097184 relates to a use of the austenitic stainless steel with TWIP effect containing in weight % 0.01-0.50% C, 0.001-0.5% Si, 6-12% Mn, 11-20% Cr, 0.01-6.0% Ni, 0.01-2.0% Mo, 0.01-2.0 Co, 0.01-6.0% Cu, 0.11-0.50% N, 0.001-0.5% Nb, 0.001-2.0% Al, the rest being Fe and unavoidable impurities. The steel may be deep drawn to form automobile components with complex geometry for energy absorption, structural reinforcements and/or applications where corrosion resistance is required.

The prior art is concentrated to describe how to produce or manufacture a steel with a TWIP hardening effect and what is their specific chemical analysis for the steel. Even though the WO publication 2014/097184 just mentions the use of the steel for automotive components, the WO publication 2014/097184 does not describe how the components are manufactured using its austenitic stainless steel.

SUMMARY OF THE INVENTION

The object of the present invention to establish a method for manufacturing a component made of austenitic manganese alloyed steel using the TWIP effect by forming of the semi-manufactured product having essentially the same thickness to a component with regions having different mechanical property values

DESCRIPTION OF THE INVENTION

According to the method of the present invention a workpiece made of manganese alloyed steel is deformed using the TWIP (Twinning-Induced Plasticity) effect of the steel to achieve a component with essentially the same thickness, the range of the uniform thickness being 0.5-2.0 millimeter but which component has at least two regions having different mechanical property values. The mechanical property values desired for each region are dependent on the deformation level or the deformation degree which is performed for the workpiece. Therefore, according to the invention it is possible to achieve regions in the component which regions have different behavior in point of for instance stiffness, energy absorption, crash resistance.

In the TWIP effect the level of hardening depends on the deforming degree or deforming level (natural strain) but is independent from the deforming process. Therefore, all forming processes according to Deutsches Institut für Normung (German Institute for Standardization) (DIN) Standard 8582 are possible The workpiece to be deformed in the method of the present invention is made of austenitic steel having stacking fault energy at the range of 18-30 mJ/m$^2$. The manganese content of the steel is 10-25 weight %, preferably 15-20 weight %. The steel advantageously contains interstitial disengaged nitrogen and carbon atoms so that the sum of the carbon content and the nitrogen content (C+N) is at least 0.4 weight %, but less than 1.2 weight %, and the steel advantageously can also contain more than 10.5 weight % chromium, being thus an austenitic stainless steel. When the steel contains essential contents of at least one ferrite former, such as chromium, the austenite formers, such as manganese, carbon, nitrogen, nickel or copper, must be adjusted to assure that the steel has an austenitic microstructure.

The workpiece to be deformed according to the invention is advantageously in the form of a sheet, a tube, a profile, a wire, a joining rivet or any similar shape where it is possible to achieve by deforming with the TWIP effect a local setting of mechanical-technological values depending on the deformation level or the deformation degree. For instance, hardness and strength of the steel are increased by means of the method of the present invention.

As one embodiment of the present invention in connection with the TWIP effect during the deformation the steel can also utilize the TRIP (Transformation induced plasticity) effect which is based on the transformation of the austenite to the martensite phase.

This TRIP effect is dependent on the stacking fault energy. When the stacking fault energy is at the range of 18-20 mJ/m$^2$ the TRIP effect can exist during the deformation in which case some austenite will be transformed to martensite, but also in that case the main part of austenite will be under the TWIP effect without any phase transformation.

The deformation of the workpiece according to the invention can be carried out with essentially all common deforming processes. Pressure deforming processes such as rolling, impression, pressing, punching, cutting, stamping or jacking are suitable for the method of the invention as well as push-pull forming processes such as deep-drawing, cupping, hydroforming, high pressure forming, collar forming or bulging. Tensile forming processes such as embossing and bent forming processes such as bending, curling, seal curling, or bending by buckling can be utilized. Further, special forming processes such as shear forming, surface distortion or explosive forming are suitable. Furthermore joining processes, which depends on forming like clincing or riveting, are possible to utlize with the present invention.

The workpiece during the deformation of the present invention is deformed to a form or geometry desired for the component based on the use of the component function. Typical forms can be crimps, feather edges, foldings, press cuts and cut edges. The form or geometry of the component can also be chosen so that the component can be mechanically joined with another component in an advantageous manner.

The deformation of the workpiece to a desired component according to the invention is carried out at the temperature range 0-400° C., preferably 20-80° C.

The component deformed according to the present invention can be applied for transport systems, such as cars, trucks, busses, railway or agricultural vehicles, as well as for automotive industry, and further in building and steel constructions, such as floor panels.

The component can be used for instance as
 a side wall, floor panel, roof, step plate or entrance component in a railway vehicle car,
 a bumper, cross member, longitudinal member, front wall, wheelhouse, dashboard cowl, pillar, channel in a passenger car
 formed sheets, tubes or profiles in agricultural machines, buses or trucks Using the component manufactured by the method of the present invention it is possible to control the intrusion during a crash as a material property by defining the region of the component based on the fact where ductile and where hardened areas are necessary.

In accordance with the method of the present invention it is advantageous to go with a ductile and soft material into a forming tool and to get out a high strength component. Normally in the prior art when it is wanted to have a high strength component it has to go into a forming tool and to get out with the same high strength material. In that case there is a possibility of cracks generating on the surface of the material during the forming process, because the deforming degree was too much for the material.

The present invention is illustrated in more details referring to the attached drawings where

BRIEF DESCRIPTION OF THE DRAWINGS

In FIG. 1 an automotive b-pillar 1 is made of an austenitic TWIP steel sheet in 1.0 mm uniform thickness and containing 0.08 weight % carbon, 21 weight % manganese, 13 weight % chromium, less than 0.5 weight % nickel and 0.40-0.45 weight % nitrogen. The b-pillar 1 is deformed so that there are four regions A, B, C and D having deforming degrees of 30%, 30-35%, 7% and 15% respectively. There are 5 measurement points (1-5) in the region A, 5 measurement points (6-10) in the region B, 7 measurement points (11-17) in the region C and 7 measurement points (18-24) in the region D.

FIG. 2 illustrates the tensile strength values in each measurement points 1-24 of the b-pillar 1. As a result it is shown that the regions with a higher deformation degree have a higher tensile strength.

Figure 1:
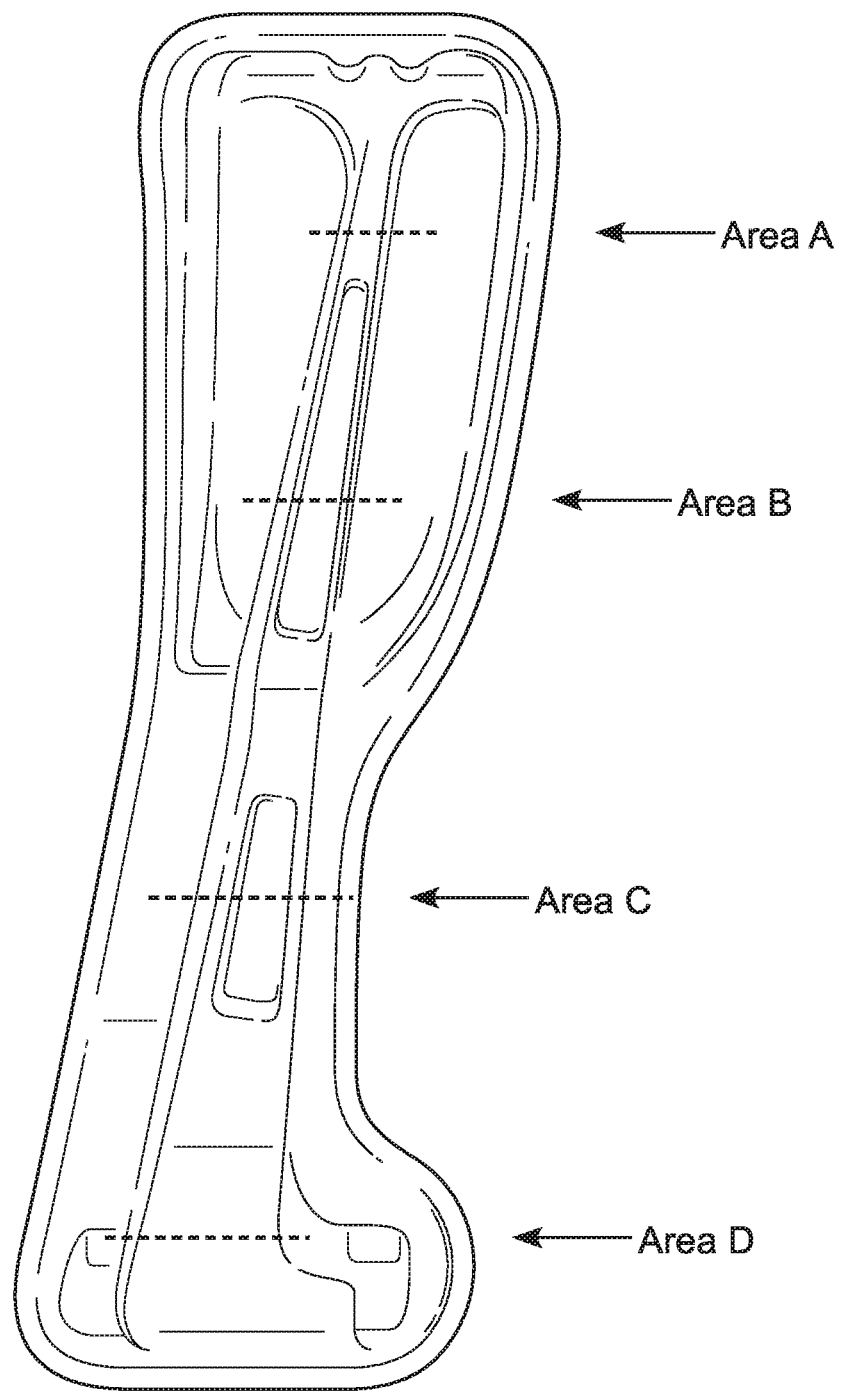
FIG. 1 shows one embodiment of the invention for a component applied as an automotive b-pillar.
Figure 2:
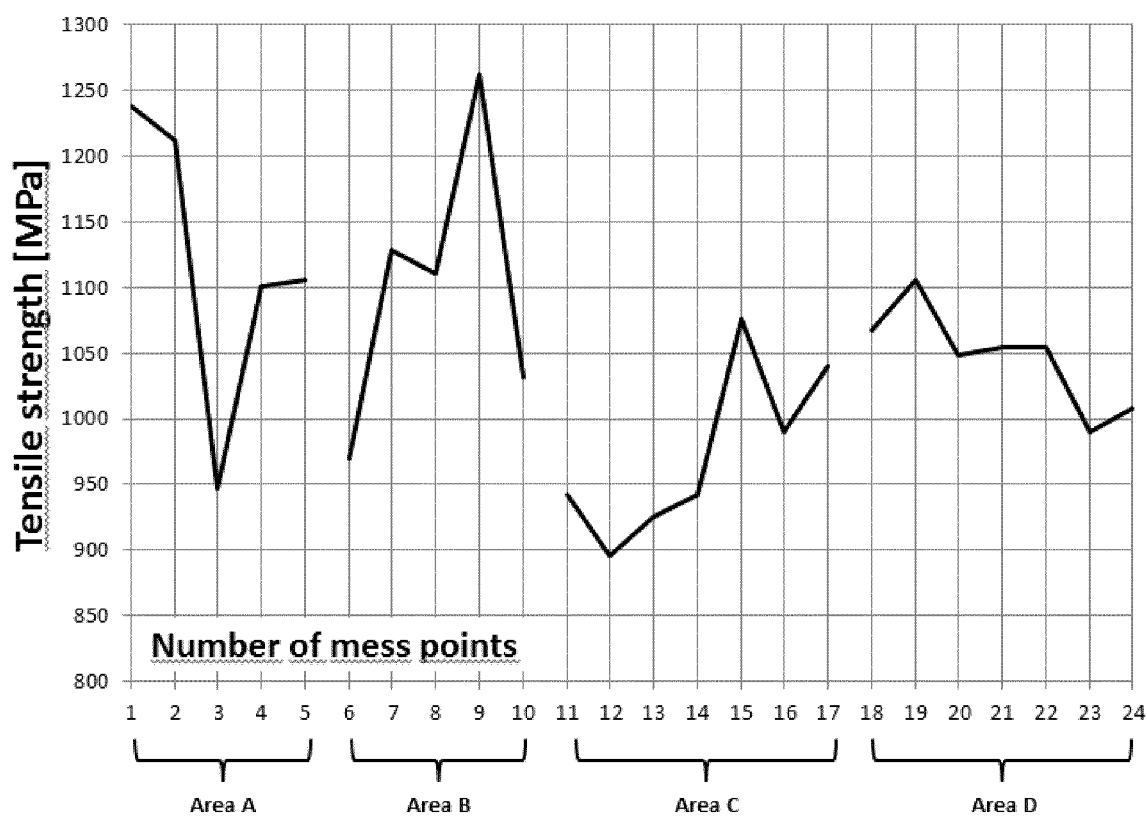
FIG. 2 shows the results based on tension strength measurements in the regions of the component according to FIG. 1.

The invention claimed is:

1. A method for manufacturing a component that is formed into a shape comprising:
 providing a workpiece comprising an austenitic manganese alloyed steel that exhibits twinning induced plasticity (TWIP) upon deformation;
 deforming a first portion of the workpiece with a first degree of strain that changes the shape of the first portion and provides the first portion with a first tensile strength and a first hardness; and
 deforming a second portion of the workpiece with a second degree of strain that is different from the first degree of strain, changes the shape of the second portion, and provides the second portion with a second tensile strength and a second hardness,
 wherein the first tensile strength is different from the second tensile strength and/or the first hardness is different from the second hardness, and
 wherein the component has a uniform thickness.

2. The method according to claim 1, wherein the deformation of the first portion and the second portion are carried out in the temperature range 0-400° C.

3. The method according to claim 1, wherein the deformation of at least one of the first portion and the second portion are carried out by rolling, impression, pressing, punching, cutting, stamping, or jacking.

4. The method according to claim 1, wherein the deformation of at least one of the first portion and the second portion are carried out by deep-drawing, cupping, hydroforming, high pressure forming, collar forming, or bulging.

5. The method according to claim 1, wherein the deformation of at least one of the first portion and the second portion are carried out by embossing.

6. The method according to claim 1, wherein the deformation of at least one of the first portion and the second portion are carried out by bending, curling, seal curling, or bending by buckling.

7. The method according to claim 1, wherein the workpiece is in the form of a sheet, a tube, a profile, a wire, or a rivet.

8. The method according to claim 1, wherein the austenitic steel contains 10-25 weight % manganese.

9. The method according to claim 1, wherein the sum of the carbon content and the nitrogen content (C+N) in the austenitic steel is more than 0.4 weight %, but less than 1.2 weight %.

10. The method according to claim 1, wherein the austenitic steel contains more than 10.5 weight % chromium.

11. The method according to claim 1, wherein a stacking fault energy of the austenitic steel is in the range of 18-30 $mJ/m^2$.

12. The method according to claim 1, wherein a stacking fault energy of the austenitic steel is in the range of 18-20 $mJ/m^2$ and the austenitic steel also exhibits transformation induced plasticity (TRIP) in addition to twinning induced plasticity.

13. The method according to claim 2, wherein the deformation of the first portion and the second portion are carried out in the temperature range 20-80° C.

14. The method according to claim 8, wherein the austenitic steel contains 15-20 weight % manganese.

* * * * *